United States Patent Office 3,263,402
Patented August 2, 1966

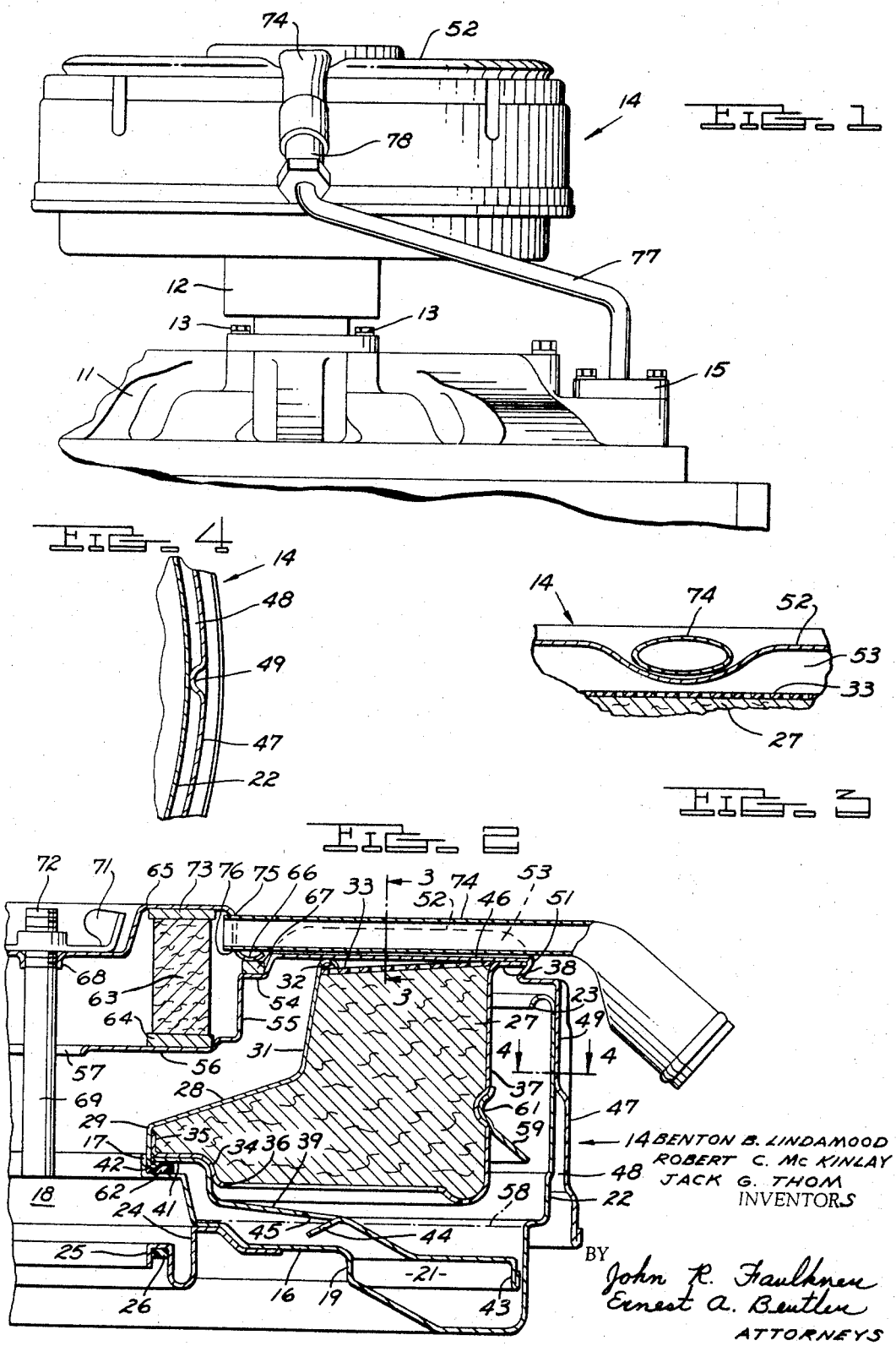

3,263,402
INTERNAL COMBUSTION ENGINE FILTRATION ASSEMBLY FOR FRESH AIR AND CRANKCASE VENTILATING AIR
Benton B. Lindamood, Detroit, Robert C. McKinlay, Dearborn, and Jack G. Thom, Detroit, Mich., assignors to Ford Motor Company, Dearborn, Mich., a corporation of Delaware
Filed Jan. 2, 1964, Ser. No. 335,235
4 Claims. (Cl. 55—252)

This invention relates to a filtration assembly for the induction system of an internal combustion engine and more particularly to a unitary assembly for filtering fresh outside air and crankcase ventilating air prior to induction.

Considerable emphasis recently has been placed upon reducing the emission of unburned hydrocarbons and other incomplete combustion products from internal combustion engines into the atmosphere. One source of these air pollutants is the ventilating air that has been circulated through the crankcase and other internal components of the engine. It has been proposed to exhaust the crankcase ventilating air into the engine induction system so that hydrocarbons will be completely burned in the cylinders prior to exhaust into the atmosphere.

Exhausting the crankcase ventilating air into the induction system downstream from the carburetor can seriously affect the fuel air ratio supplied to the cylinders and the operation of the engine particularly at low speeds and partial loads. The foreign matter additionally has a tendency to accumulate in the intake manifold and will cause undesirable deposits upon the valves. If the air is discharged into the induction system upstream from the carburetor, the foreign particles rapidly accumulate in the carburetor discharge orifices requiring frequent servicing.

It has been proposed, therefore, to discharge the crankcase ventilating air into the air filter of the engine upstream from the filter element. The filter element will then remove the larger particles and oil vapors from the air before it passes through the carburetor and induction system. The discharge of crankcase ventilating air into the induction system air filter, however, can present detrimental effects upon the engine operation under some conditions. The filter element accumulates foreign particles very rapidly and a more frequent service interval is required to prevent a reduction in breathing capacity. In addition, the gases flowing from the crankcase contain both oil and water vapor at an elevated temperature. The air filter assembly is at a lower temperature due to the mass air flow of cooler outside air. When the vapors from the crankcase enter the air filter assembly, the decrease in temperature causes the oil and water to condense in the filter element itself or in the air filter body. The temperature may be sufficiently low to cause the water to freeze and form ice around the periphery of the filter element. The ice formation reduces the breathing capacity of the engine and causes poor economy.

The aforementioned problem is particularly acute in the oil bath type air filter. In an oil bath type air filter, a filter medium is placed a finite distance above the normal level of oil contained in the air filter sump. Air flow through the air filter takes place through this clearance area. As the oil and water contained in the crankcase ventilating air condense in the air filter, the oil level rises and decreases the clearance through which air flow may take place. It is quite possible for the level of liquid in the sump to reach a point wherein air flow cannot take place at all.

It, therefore, is a principal object of this invention to provide an improved air filter assembly that filters both the fresh outside air for the engine induction system and the crankcase ventilating air prior to its induction into the engine induction system.

It is a further object of this invention to provide an improved air filter assembly that contains separate filter elements for the fresh air and for the crankcase ventilating air.

An internal combustion engine embodying this invention has an induction system and a crankcase ventilating system including a ventilating air outlet. An air filter assembly is provided for the induction system. The air filter assembly includes a body having a fresh air inlet, a crankcase ventilating air inlet and an air outlet in communication with the inlet of the induction system. A first filter medium is supported in the body assembly between the fresh air inlet and the air outlet to filter fresh air prior to its entry into the induction system. A second filter medium is supported in the body assembly between the crankcase ventilating air inlet and the air outlet. Conduit means interconnect the ventilating air outlet of the crankcase ventilating system with the crankcase ventilating air inlet of the air filter body assembly for discharging crankcase ventilating air into the induction system after filtration by the second filter medium.

Further objects and advantages of this invention will become more apparent when considered in conjunction with the accompanying drawings, wherein:

FIGURE 1 is a side elevational view of a portion of an internal combustion engine embodying this invention.

FIGURE 2 is a partial cross sectional view taken through the center of the air filter assembly shown in FIGURE 1.

FIGURE 3 is a cross sectional view taken along the line 3—3 of FIGURE 2.

FIGURE 4 is a cross sectional view taken along the line 4—4 of FIGURE 2.

Referring now in detail to the drawings, FIGURE 1 is a partial side elevational view of a V-type internal combustion engine having an intake manifold 11. A carburetor 12 is secured to the intake manifold 11 by a plurality of bolts 13. An air filter assembly, indicated generally by the reference numeral 14, is supported upon the intake of the carburetor 12 in a manner to be described.

The engine is provided with a ventilating system for circulating fresh air through the crankcase and other internal components. The crankcase ventilating air is exhausted from a crankcase ventilating air outlet 15 positioned at the rear of the intake manifold 11. The particular ventilating air outlet shown is exemplary of only one possible outlet location. Other locations are well known in the art and the particular air outlet location or the particular type of crankcase ventilating system form no part of the invention.

The air filter assembly 14 will now be described by particular reference to FIGURES 2–4. The air filter assembly 14 has a body part comprising a lower tray 16. The tray 16 has a cylindrical upstanding flange 17 that is axially aligned with the inlet of the carburetor 12. The flange 17 defines an aperture 18 that forms an air outlet for the air filter assembly 14. The lower tray 16 is formed with an axially depressed portion 19 radially outwardly of the flange 17 that forms an oil sump 21. At the outer extremity of the oil sump 21, the lower tray 16 has an upwardly extending cylindrical flange 22. The upper end of the flange 22 terminates in a downturned baffle 23.

A support adaptor 24 is spot welded to the lower tray 16 adjacent the flange 17. The support adaptor 24 is formed with a circumferential inverted channel 25 that is adapted to be received upon the air inlet of the carburetor 12. A gasket 26 is received in the channel 25 to assure an air-tight seal with the carburetor 12.

A fibrous filter medium 27 is supported upon the lower tray 16. The fibrous filter medium 27 is surrounded on the inside by a substantially imperforate sheet metal inner shell 28. The inner shell 28 has a downturned flange 29 that extends circumferentially around the flange 17 of the lower tray 16. The inner shell 28 extends upward and radially outwardly from the outlet opening 18 above the flange 29. At a point near the axial center of the inner shell 28, a substantially cylindrical section 31 is formed that is concentric with the air outlet 18. The cylindrical section 31 terminates at a downturned flange 32 that contacts a perforated retaining member 33. The retaining member 33 extends across the upper surface of the fibrous filter medium 27 and forms an air outlet therefrom.

A sheet metal lower shell 34 encloses the lower surface of the fibrous filter medium 27. The lower shell 34 has an upturned flange 35 that abuts the outer surface of the inner shell flange 29. The lower shell 34 extends in a substantially radial direction from the flange 35 toward the outer periphery of the fibrous filter medium 27. A plurality of openings 36 are formed in the lower shell 34 circumferentially around the fibrous filter medium 27 to provide an air inlet to the lower surface of the fibrous filter medium 27. The lower shell 34 has an upturned portion 37 that is substantially imperforate and forms an outer shell for the fibrous filter medium 27. The outer shell 37 terminates at a radially outwardly extending flange portion 38.

A baffle 39 has a radially extending portion 41 that is affixed to the inner shell 28 and lower shell 34 by an overturned portion 42 of the inner shell 28. The baffle 39 extends downwardly into the oil sump 21 and terminates at a downturned flange 43 that is slightly spaced from the lower tray flange 22 to permit a metered quantity of oil to pass between the flanges 22 and 43. The baffle 39 is provided with a plurality of circumferentially spaced downturned tabs 44 that form oil return openings 45.

An imperforate cover plate 46 has a downturned skirt 47 that extends circumferentially around the lower tray flange 22 for a major portion of its axial length. The flange 22 and skirt 47 are radially spaced to provide an air inlet opening 48 extending circumferentially around the air filter assembly 14. A plurality of circumferentially spaced axially extending indentations 49 are formed in the skirt 47 to contact the outer surface of the flange 22 (FIGURE 4). The indentations 49 circumferentially locate the cover plate 46 with respect to the lower tray 16.

The radially extending flange 38 of the outer shell 37 is crimped to the cover plate 46, as at 51, to secure the cover plate 46 to the outer shell 37 and integral lower shell 34 as well as to the inner shell 28. The cover plate 46 has axially extending dome parts 52 that provide a clearance 53 above the retaining member 33 to permit air to flow radially from the fibrous filter medium 27 toward the air outlet 18.

Radially inwardly of the inner shell cylindrical section 31, the cover plate 46 is formed with a circumferential ledge 54 that terminates at a depressed central part of the cover plate 46. The depressed central part includes a cylindrical wall 55 that extends radially inwardly of the inner shell part 31. The cylindrical wall 55 terminates at a radially extending lower wall 56 formed with a central opening 57 that is axially aligned with the air outlet 18.

The cover plate 46 forms the upper wall of a first filter area defined within the air filter assembly 14. Filtration of outside air prior to induction into the carburetor 12 and intake manifold 11 is accomplished in this filter area. Fresh outside air enters through the air inlet opening 48 provided between the flange 22 and the skirt 47. The air flows downwardly through the clearance between the outer shell 37 and the flange 22. The air passes radially between the lower shell 34 and the normal oil level in the sump 21, indicated by the line 58. The air flow then is turned through 90 degrees to pass upwardly through the openings 36 in the lower shell 34. The air flow causes oil to be drawn from the oil sump 21 into the lower surface of the fibrous filter medium 27. The quantity of oil entering the fibrous filter medium 27 is metered by the clearance between the flanges 43 and 22. After the particles are removed from the air by the oil and fibrous filter medium 27, the air passes through the openings in the retaining member 33 and again is turned through an angle of 90 degrees to flow radially through the clearance 53. The air flow then is again turned through an angle of 90 degrees to flow through the clearance between the cylindrical wall 55 and the inner shell cylindrical section 31 for discharge from the outlet opening 18 into the induction system of the engine.

The oil that accumulates in the lower portion of the fibrous filter medium 27 will collect dirt and eventually flow back into the sump 21 through the oil return openings 45 in the baffle 39. A baffle 59 is secured to the lower edge of the outer shell 37 as by crimping 61. The baffle 59 radially overlaps the baffle 23 so that oil will not be splashed from the sump 21 out of the air inlet opening 48.

The fibrous filter medium 27 may be removed for servicing by lifting the entire assembly including the cover plate 46 off of the lower tray 16. As has been noted, the inner shell flange 29 extends circumferentially around the flange 17 of the lower tray 16 whereon it is supported. A gasket 62 is positioned adjacent the flange 17 to preclude the leakage of air past the fibrous filter medium 27.

The cover plate 46, in addition to defining the upper wall of a first filter area, defines the lower wall of a second filter area formed within the air filter assembly 14. The filtration of crankcase ventilating air prior to discharge in the induction system of the engine is accomplished within the second filter area. The second filter area is defined primarily by the central depression in the cover plate 46 comprising the cylindrical wall 55 and the radially extending lower wall 56.

An air filtration cartridge, indicated generally by the reference numeral 63, has a lower sealing cap 64 that is supported upon the radially extending lower wall 56. The filtration cartridge 63 is of a dry type employing as a filter medium pleated paper, foamed plastics or synthetic fibers. The filtration cartridge 63 extends circumferentially around the central opening 57 and has its outer surface spaced radially inwardly from the cylindrical wall 55. It should be noted that a major portion of the filtration cartridge 63 extends axially inward of the upper surface of the first fibrous filter medium 27 to provide a compact assembly.

A second cover plate or closure 65 extends across the depressed central portion of the cover plate 46 and has a downwturned flange 66 that contacts a gasket 67 supported upon the ledge 54. The closure 65 has a central aperture 68 that receives a stud 69 that extends upwardly from the center of the carburetor air inlet. A wing nut 71 is turned upon a threaded end 72 of the stud 69 to urge the closure 65 against an upper sealing cap 73 of the air filtration cartridge 63 and to urge the flange 66 against the gasket 67. In addition the wing nut 71 urges the first fibrous medium 27 and its surrounding sheet metal shells into engagement with the gasket 62 to provide complete sealing within the air filter assembly 14. The gasket 26 also is compressed against the air inlet of the carburetor 12 by the wing nut 71.

An air inlet tube 74 has a flattened portion 75 that extends through an oblong aperture 76 formed in the closure 65 adjacent the outer periphery of the filtration cartridge 63.

Referring now to FIGURE 1, the crankcase ventilating air is discharged from the ventilating air outlet 15 at the rear of the intake manifold 11 through a conduit 77. The upper end of the conduit 77 may be connected to a flow regulating valve 78 that extends into the inlet tube 74. The exhausted crankcase ventilating air passes through the conduit 77 and flow regulating valve 78 into the space between the outer periphery of the air filter cartridge 63 and the inner surface of the closure 65 and cover plate 55.

It should be readily apparent that by providing a separate filter element for the crankcase ventilating gases, the filter element that purifies the outside air will not require frequent servicing. The water and oil vapors contained in the crankcase ventilating gases also will not be permitted to condense in the portion of the air filter assembly that filters the outside air.

Although this invention has been described with particular reference to an oil bath type air cleaner, the use is not so limited. The invention has particular utility in combination with oil bath type air cleaners, however. The location for the crankcase ventilating air filter shown and described, although resulting in a compact assembly, is no more than a preferred embodiment. Other locations within the air filter assembly may be used, so long as provision is made to replace the crankcase ventilating air filter without removing the other filter element. Various other changes and modifications may be made without departing from the spirit and scope of the invention as defined by the appended claims.

We claim:

1. An air filter assembly for the induction system of an internal combustion engine comprising a body part, said body part including a lower tray having a central aperture forming an air outlet adapted to communicate with the induction system, a cover plate affixed axially relative to said body part, a first filter medium interposed between said lower tray and said cover plate around said central aperture, a fresh air inlet communicating with one side of said first filter medium, another side of said first filter medium being in open communication with said central aperture for air flow from said fresh air inlet through said first filter medium and out of said central aperture, said cover plate having a depressed central portion having a central opening in open communication with the central aperture of said lower tray, a second filter medium received in said depressed central portion around said central opening, a closure for said central portion laterally removed from said central opening, said closure and said central portion being on opposite ends of said second filter medium, means removably securing said closure relative to said body portion, and a ventilating air inlet in said closure radially outwardly of said central opening and on the opposite side of the second filter medium.

2. An air filter assembly for the induction system of an internal combustion engine comprising a body part, said body part including a lower tray having a central aperture forming an outlet adapted to communicate with the induction system, a cover plate affixed axially relative to said body part, a first filter medium interposed between said lower tray and said cover plate circumferentially around said central aperture, a fresh air inlet communicating with one side of said first filter medium, another side of said first filter medium being in open communication with said central aperture, said cover plate having a depressed central portion including a first part extending axially toward said lower tray and being located at least partially radially inward of said first filter medium, said first part terminating in a second part extending radially inwardly from said first part, a second filter medium supported upon the second part of said depressed central portion, a closure for said central portion laterally removed from said central opening, said closure and said central portion being on opposite ends of said second filter medium, means removably securing said closure to said body part, a ventilating air inlet extending into the area defined by said depressed central portion and said closure on one side of said second filter medium, and an air outlet from said last named area on the other side of said second filter medium, said air outlet being in open communication with the central aperture of said lower tray.

3. An air filter assembly for an internal combustion engine having an induction system and a crankcase ventilating system including a ventilating air outlet, said air filter assembly comprising a body part, said body part including a lower tray having a central aperture forming an outlet in communication with said induction system, a cover plate affixed axially relative to said body part, a first filter medium interposed between said lower tray and said cover plate circumferentially around said central aperture, a fresh air inlet communicating with one side of said first filter medium, another side of said first filter medium being in open communication with said central aperture, said cover plate having a depressed central portion comprising a first part extending axially toward said lower tray and being spaced in part radially inwardly of said first filter medium, a second part extending radially inwardly from said first part and terminating in a central opening axially aligned with said central aperture, a second filter medium supported upon said second part around said central opening, a closure for said central portion laterally removed from said central opening, said closure and said central portion being on opposite sides of said second filter medium, means removably securing said closure to said body part, a ventilating air inlet in said closure spaced radially outwardly of said second filter medium, said ventilating air inlet and said central opening being on opposite ends of said second filter medium, and conduit means adapted to interconnect the ventilating air outlet of said crankcase ventilating system and the ventilating air inlet in said closure for discharging crankcase ventilating air into said induction system after filtration by said second filter medium.

4. An air filter assembly for the induction system of an internal combustion engine comprising a body part, said body part having a lower tray defining a central aperture adapted to form an outlet to the engine induction system, said tray forming an oil sump circumferentially around said central aperture, a first filter media having axially extending substantially imperforate inner and outer shells, said first filter media being supported within said body part with its inner shell around said central aperture, the lower surface of said first filter media extending radially above the normal oil level in said sump, a cover plate extending radially across the upper surface of said first filter media and being axially spaced therefrom, said cover plate having an inner portion including a first part extending axially downwardly therefrom and being spaced at least in part radially within said inner shell, a second part extending radially inwardly from said first part and terminating in a central opening axially aligned with said central aperture, a second filter media having its lower surface supported upon said second part and extending circumferentially around said central opening, a closure extending across the upper surface of said second filter media, means detachably securing said closure to said body part, and a ventilating air inlet in said closure radially outwardly of said second filter media.

References Cited by the Examiner

UNITED STATES PATENTS

| 1,856,527 | 5/1932 | Winslow | 123—119 |
| 2,742,057 | 5/1956 | Krieck. | |
| 2,834,419 | 5/1958 | Sebok | 55—315 X |
| 3,111,120 | 11/1963 | Cornell | 123—55 X |
| 3,167,060 | 1/1965 | Fowler et al. | 123—119 |
| 3,186,391 | 6/1965 | Kennedy | 123—119 |

FOREIGN PATENTS 776,337  6/1957  Great Britain.

ROBERT F. BURNETT, *Primary Examiner.*

HARRY B. THORNTON, *Examiner.*

D. K. DENENBERG, *Assistant Examiner.*